United States Patent
Ouchi

(10) Patent No.: US 8,902,364 B2
(45) Date of Patent: Dec. 2, 2014

(54) IMAGE DISPLAY APPARATUS, IMAGE DISPLAY METHOD, AND NON-TRANSITORY COMPUTER-READABLE STORAGE MEDIUM FOR SUPPRESSING MOTION BLUR WITHOUT CHANGING GRADATION

(71) Applicant: Canon Kabushiki Kaisha, Tokyo (JP)

(72) Inventor: Akihiro Ouchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/174,944

(22) Filed: Feb. 7, 2014

(65) Prior Publication Data

US 2014/0226071 A1    Aug. 14, 2014

(30) Foreign Application Priority Data

Feb. 12, 2013   (JP) ................. 2013-024916

(51) Int. Cl.
- *H04N 9/64*    (2006.01)
- *H04N 9/475*   (2006.01)
- *G09G 5/10*    (2006.01)
- *H04N 5/205*   (2006.01)
- *H04N 5/21*    (2006.01)

(52) U.S. Cl.
CPC . *H04N 5/205* (2013.01); *H04N 5/21* (2013.01)
USPC ............................ 348/606; 348/678; 345/589

(58) Field of Classification Search
USPC .............. 348/607, 790, 678, 687, 208.1, 241, 348/606, 625; 345/589, 690, 581, 611, 87, 345/89, 102; 382/263, 266
See application file for complete search history.

(56) References Cited

U.S. PATENT DOCUMENTS

| | | | | |
|---|---|---|---|---|
| 2005/0030302 A1* | 2/2005 | Nishi et al. | ..................... | 345/204 |
| 2008/0180385 A1* | 7/2008 | Yoshida et al. | ............... | 345/102 |
| 2009/0040376 A1* | 2/2009 | Kobayashi | ..................... | 348/452 |
| 2011/0025726 A1* | 2/2011 | Tatsumi | ........................ | 345/690 |
| 2012/0127216 A1* | 5/2012 | Kimura | ......................... | 345/690 |

FOREIGN PATENT DOCUMENTS

JP    2006-184896 A    7/2006

* cited by examiner

*Primary Examiner* — Victor Kostak
(74) *Attorney, Agent, or Firm* — Carter, DeLuca, Farrell & Schmidt, LLP

(57) ABSTRACT

An image display apparatus which divides the 1-frame period of input image data into a plurality of periods and displays image data in the respective divided periods separates high frequency component data by using the input image data, and distributes the amplitude of the high frequency component data for the image data in the respective divided periods to make the amplitude of the separated high frequency component data fall within a difference between the gradation of the input image data, and 0 gradation or the maximum gradation of an image.

13 Claims, 6 Drawing Sheets

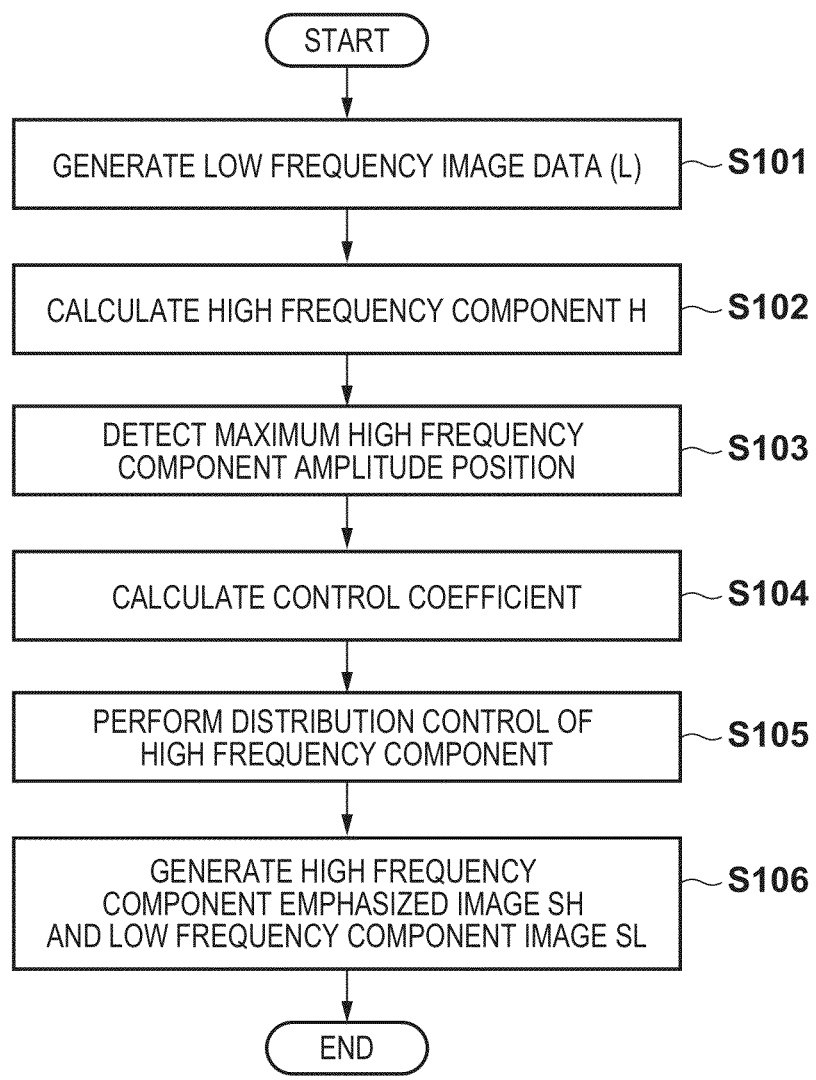

IMAGE DISPLAY APPARATUS, IMAGE DISPLAY METHOD, AND NON-TRANSITORY COMPUTER-READABLE STORAGE MEDIUM FOR SUPPRESSING MOTION BLUR WITHOUT CHANGING GRADATION

BACKGROUND OF THE INVENTION

1. Field of the Invention

The present invention relates to an image display apparatus and method capable of suppressing a "motion blur" without changing the gradation.

2. Description of the Related Art

Recently, various apparatuses equipped with image display means, including a TV receiver and PC monitor, have been put into practical use. As these image display means, various devices such as a liquid-crystal display apparatus are used. For example, the liquid-crystal display apparatus adopts a method of adjusting a constantly emitting backlight by a liquid-crystal shutter, and outputs light in every 1-frame period throughout the 1-frame period. Thus, the liquid-crystal display apparatus is called a hold-type display apparatus. When pursuit of a moving image (viewing of tracking a moving portion with a line of sight on a moving image display) is performed on the hold-type display apparatus, a "motion blur" corresponding to the light output period is observed. In a 60-Hz moving image display, a minimum of 16.7-ms "motion blur" is observed in principle.

As a technique for reducing the "motion blur", there is proposed a method of changing an input image having a 60-Hz frame rate to have a 120-Hz double frame rate, increasing the spatial high frequency component of the image in one subframe, and decreasing it in the other subframe. In a technique disclosed in Japanese Patent Laid-Open No. 2006-184896, the perception of the edge of an image is made close to the impulse type by shifting the center of gravity of the display time of the spatial high frequency component. Also, in the technique disclosed in Japanese Patent Laid-Open No. 2006-184896, an increase and decrease in spatial high frequency component are canceled between subframes. When an image is viewed at a frame rate of 60 Hz, a decrease in luminance, that is, a change of the gradation can be prevented.

When calculating an image whose spatial high frequency component is increased, the calculated gradation may deviate from a displayable gradation (underflow/overflow). If an underflow/overflow occurs in an image whose spatial high frequency component has been increased, an increase and decrease in spatial high frequency component cannot be canceled, and the gradation changes in the corresponding pixel. It is ideal to suppress a "motion blur" without changing the gradation. It is therefore necessary to adjust the decrease amount of the high frequency component so that an image whose spatial high frequency component has been increased falls within the displayable gradation.

In Japanese Patent Laid-Open No. 2006-184896, the high frequency component is adjusted, so that the number of gradations of an image whose spatial high frequency component has been increased becomes equal to or smaller than the maximum number of gradations in order not to change the gradation. However, if the high frequency component is decreased uniformly, the "motion blur" suppression effect may degrade. Also, an image whose spatial high frequency component has been increased may become equal to or smaller than 0 gradation (underflow). However, this is not especially an issue in Japanese Patent. Laid-Open No. 2006-184896.

SUMMARY OF THE INVENTION

The present invention has been made to solve the conventional problems, and suppresses a "motion blur" in accordance with the gradation of an input image without changing the gradation.

According to one aspect of the present invention, there is provided an image display apparatus which divides a 1-frame period of input image data into a plurality of periods and displays image data in the respective divided periods, comprising: a separation unit configured to separate high frequency component data by using the input image data; and a high frequency component control unit configured to distribute an amplitude of the high frequency component data for the image data in the respective divided periods to make the amplitude of the separated high frequency component data fall within a difference between a gradation of the input image data and one of 0 gradation and a maximum gradation of an image.

Further features of the present invention will become apparent from the following description of exemplary embodiments (with reference to the attached drawings).

BRIEF DESCRIPTION OF THE DRAWINGS

FIG. 2 is a flowchart for explaining processing according to the first embodiment;

DESCRIPTION OF THE EMBODIMENTS

Embodiments of the present invention will now be described with reference to the accompanying drawings.

[First Embodiment]

Figure 1:
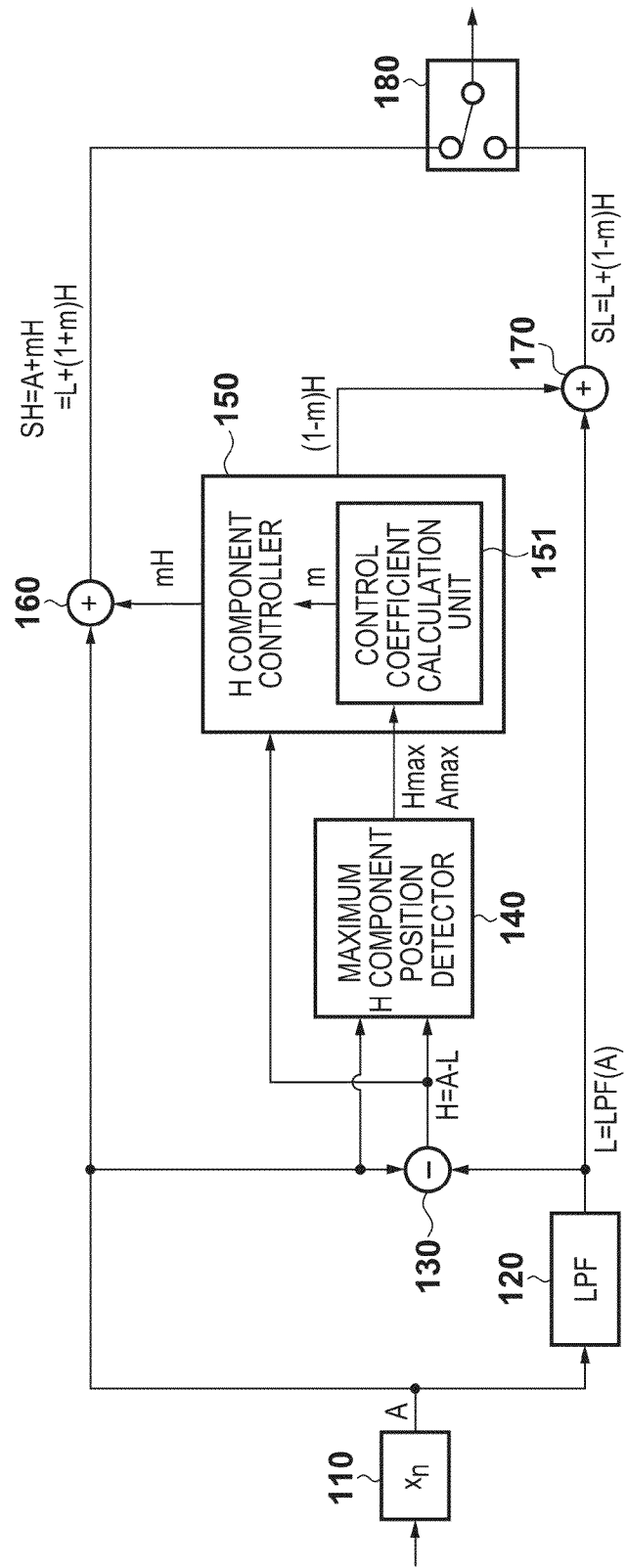
FIG. 1 is a schematic block diagram of an image display apparatus according to the first embodiment.

FIG. 1 shows an example of the schematic blocks of an image display apparatus according to the first embodiment. In this arrangement, the image display apparatus includes an Nx speed, processor 110, a low pass filter (to be referred to as an LPF hereinafter) 120, a subtracter 130, a maximum high frequency component position detector 140, a high frequency component controller 150, adders 160 and 170, and a selector 180.

The Nx speed processor 110 divides input image (moving image) data input in every 1-frame period into a plurality of periods, and generates N subframe data. In the embodiment, N=2. That is, a frame input at 60 Hz is divided into two subframes to convert the image into 120-Hz images and output, them. The Nx speed processor 110 outputs subframe data A. The LPF 120 generates low frequency component data L by separating and cutting off (filtering) an upper limit spatial frequency indicated by a predetermined constant from the subframe data A output from the Nx speed processor 110. Note that the cutoff frequency mentioned here can be regarded as the number of pixels. The subtracter 130 calculates high frequency component data H by subtracting, from the subframe data A, the low frequency component data L separated and generated by the LPF 120 (H=A−L). Note that the high frequency component data H will be referred to as a high frequency component amplitude.

The maximum high frequency component position detector 140 detects a pixel position where the polarity of the high frequency component is the same as that in a pixel of interest and the high frequency component amplitude becomes maximum in the same area as the filtering area (separation area) of the LPF 120 centered on the pixel position of interest. The detection of the pixel position where the high frequency component amplitude becomes maximum is limited to a region where the same polarity as that of the high frequency component in the pixel of interest continues. The maximum high frequency component position detector 140 outputs a gradation Amax of input image data and an amplitude Hmax of high frequency component data at the detected pixel position.

To prevent generation of an underflow/overflow in generation of a high frequency component emphasized image, it suffices to make the amplitude Hmax of high frequency component data fall within the difference between the gradation Amax of input image data and 0 gradation or the maximum gradation of an image. To achieve this, the high frequency component controller 150 includes a control coefficient calculation unit 151 and calculates a control coefficient m based on the input Amax and Hmax according to the following equations:

if the high frequency component amplitude has a negative polarity:

$$m = A\max/|H\max| \ (A\max < |H\max|) \quad (1)$$

$$m = 1 \ (A\max \geq |H\max|) \quad (2)$$

if the high frequency component amplitude has a positive polarity:

$$m = (2^n - A\max)/H\max \ ((2^n - A\max) < H\max) \quad (3)$$

$$m = 1 \ ((2^n - A\max) \geq H\max) \quad (4)$$

where n is the number of gradation bits of an image.

The high frequency component controller 150 performs distribution control by using the calculated control coefficient m for the high frequency component H at the pixel position of interest. More specifically, the high frequency component controller 150 calculates and outputs mH and (1−m)H. The adder 160 serving as the first adder adds one distribution-controlled high frequency component data mH to the subframe data A, generating high frequency component emphasized image data SH whose high frequency component is emphasized, as represented by:

$$SH = A + mH = L + (1+m)H \quad (5)$$

The adder 170 serving as the second adder adds the other distribution-controlled high, frequency component, data (1−m)H to the low frequency component data L, generating low frequency component, image data SL represented by:

$$SL = L + (1-m)H \quad (6)$$

The selector 180 switches between the high frequency component emphasized image data SH and the low frequency component image data SL for each subframe to arrange them in a predetermined order and outputs them.

FIG. 2 is a flowchart showing a processing sequence according to the first embodiment. In step S101, the LPF 120 generates low frequency component data L from subframe data A output from, the Nx speed processor 110. In step S102, the subtracter 130 calculates high frequency component, data H by subtracting the low frequency component data L from the subframe data A. In step S103, the maximum, high frequency component position detector 140 detects a pixel, position where the polarity of the high frequency component is the same as that in a pixel of interest and the high frequency component amplitude becomes maximum in the filtering area centered on the pixel of interest. In step S104, the control coefficient calculation unit 151 calculates the control coefficient m from the input image data and high frequency component data at the pixel position detected in step S103. In step S105, the high frequency component controller 150 performs distribution control of the high frequency component by using the control coefficient m calculated in step S104. In step S106, the adders 160 and 170 generate high frequency component emphasized image data SH and low frequency image data SL by using the high frequency component distribution-controlled in step S105.

Figures 3A, 3B, 3C:
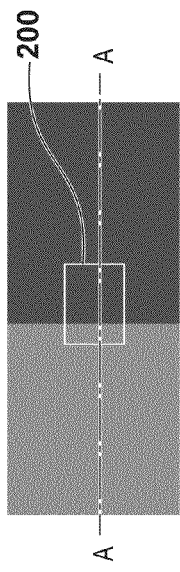
FIGS. 3A to 3C are views for explaining an example of processing according to the first embodiment.

Processing according to the first embodiment will be explained with reference to FIGS. 3A to 3C. In FIGS. 3A to 3C, a filtering area 200 of 15 (horizontal)×11 (vertical) pixels is assumed, as shown FIG. 3A. FIGS. 3B and 3C show an input image gradation A and high frequency component amplitude H, respectively. In FIG. 3C, the high frequency component of a pixel position 210 of interest has a negative polarity. Hence, the maximum high frequency component position detector 140 detects a pixel position 220 where the high frequency component amplitude becomes maximum in a region 300 where the same polarity as that at the pixel position of interest continues. The control coefficient calculation unit 151 calculates the control coefficient m=0.66 by applying, to equation (1) described above, the high frequency component amplitude |Hmax|=7442 at the pixel position 220, and the input image gradation data Amax=4933. Then, the control coefficient calculation unit 151 performs distribution control of the high frequency component amplitude by using the calculated control coefficient m. In this case, the control coefficient m is the same regardless of the pixel position of interest in the region 300. In this manner, the same control coefficient is applied to a region where the same polarity of the high frequency component is the same in the filtering area. This allows control of an amplitude which, maintains a monotonia increase of the high frequency component amplitude.

Figure 4A:
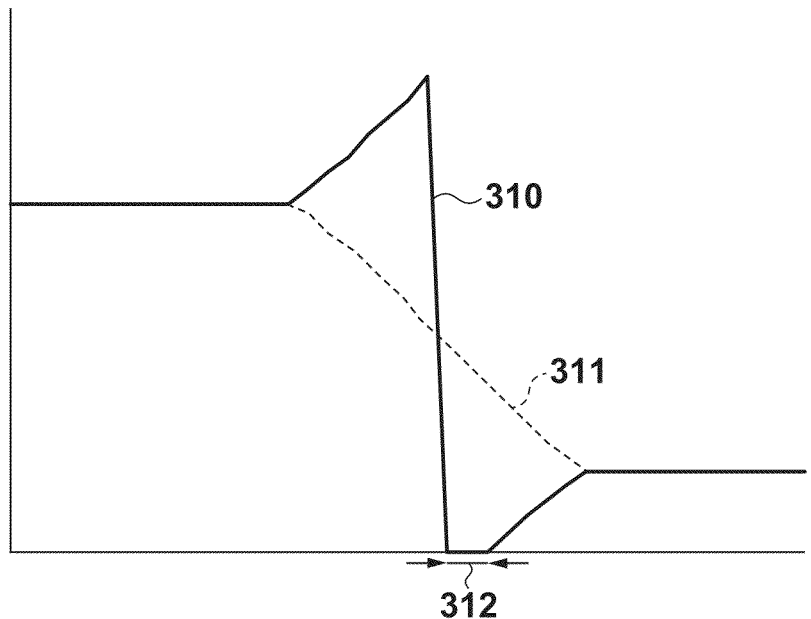
FIGS. 4A and 4B are views for explaining distribution control of a high frequency component according to the first embodiment.
Figure 4B:
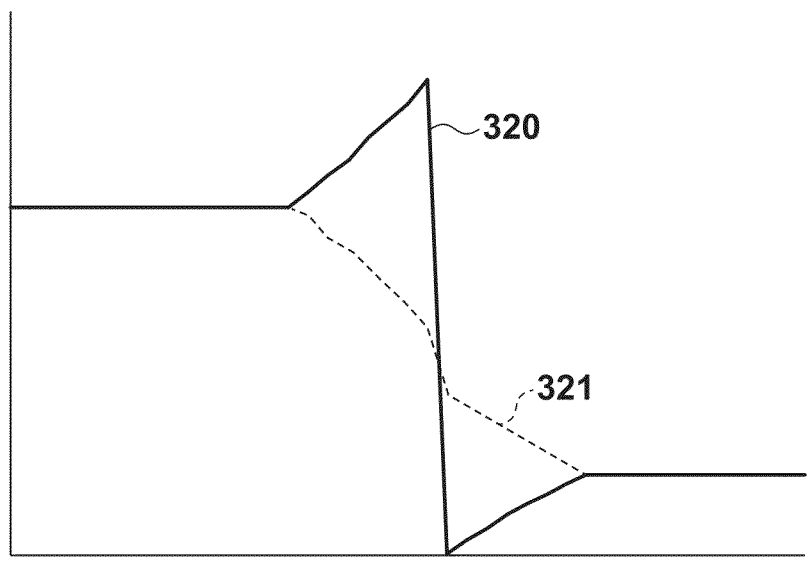

Next, distribution control of the high frequency component according to the first embodiment will be explained with reference to FIGS. 4A and 4B. FIG. 4A shows high frequency component emphasized image data SH310 and a low frequency component image SL311 in a section A-A in FIG. 3A when the embodiment is not applied. An underflow occurs in the high frequency component emphasized image data SH310. For this reason, SH+SL>A at a portion 312 in FIG. 4A, and the gradation is recognized to be brighter than the gradation of the input image. FIG. 4B shows high frequency component emphasized image data SH320 and a low frequency component image SL321 when control according to the embodiment is applied. Distribution control of the high frequency component is performed by an amount corresponding to the negative polarity of the high frequency component. As a result, an underflow can be prevented and a display free from a change of the gradation can be presented.

Figures 5A, 5B, 5C:
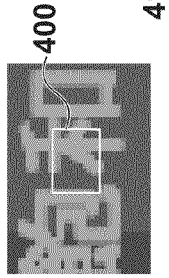
FIGS. 5A to 5C are views for explaining an example of processing according to the first embodiment.

FIGS. 5A to 5C show an example in which control according to the embodiment is applied to a more complicated image. In FIGS. 5A to 5C, a filtering area 400 of 15×11 pixels is assumed for an image as shown FIG. 5A. FIGS. 5B and 5C snow an input image gradation A and high frequency component amplitude H, respectively. In FIG. 5C, the high frequency component at a pixel position 410 of interest has a negative polarity. There are four regions 500, 501, 502, and 503 where the polarity of the high frequency component becomes negative in the filtering area 400. However, the region where the same polarity as that at the pixel position of interest continues is the region 500. Thus, the maximum high frequency component position detector 140 detects a pixel position 420 where the high frequency component, amplitude becomes maximum (|Hmax|=10140).

At this time, for example, the maximum value of the high frequency component amplitude having a negative polarity in the filtering area is an amplitude of |H|=13343 in a pixel included in the region 501. However, if the pixel position of interest is positioned left by two or more pixels in the region 500, the region 501 falls outside the filtering area. In this case, the control coefficient changes in the region 500, and a change of the high frequency component amplitude does not become a monotonic increase or monotonic decrease. If neither a monotonic increase nor monotonic decrease of the high frequency component amplitude is maintained, a change of the gradation may be visually recognized in the display. To prevent this, a pixel position where the high frequency component amplitude becomes maximum is detected from the region (region 500 in FIG. 5C) where the polarity of the high frequency component in the pixel of interest continues.

The control coefficient calculation unit 151 calculates the control coefficient m=0.26 by applying, to equation (1) described above, the high frequency component amplitude |Hmax|=10140 at the pixel position 420 and the input, image gradation data Amax=2693. Then, the control coefficient calculation unit 151 performs distribution control of the high frequency component amplitude by using the calculated control coefficient m. In this case, the control coefficient m is the same regardless of the pixel position of interest in the region 500.

In the description of the embodiment, the maximum high frequency component position detector 140 detects a specific pixel position in the same area as the filtering area of the LPF 120 centered on the pixel position of interest. However, the present invention is not limited to this, and the same processing effects as those described above can be implemented even when the area is wider than the filtering area of the LPF 120. Also, almost the same processing effects as those described above can be obtained as wide as the area is about ⅔ of the filtering area of the LPF 120.

According to the first embodiment, since the high frequency component controller is arranged, the gradation of a high frequency component emphasized image can be controlled to prevent generation of an overflow/underflow. Since the control coefficient of the high frequency component amplitude is the same in almost the same area as the filtering area of the LPF, the gradation of the high frequency component emphasized image can be controlled while maintaining a monotonic increase/monotonic decrease of the high frequency component amplitude. As a result, there can be provided an image display apparatus capable of suppressing a "motion blur" in accordance with the gradation of an input image without changing the gradation.

[Second Embodiment]

Figure 6:
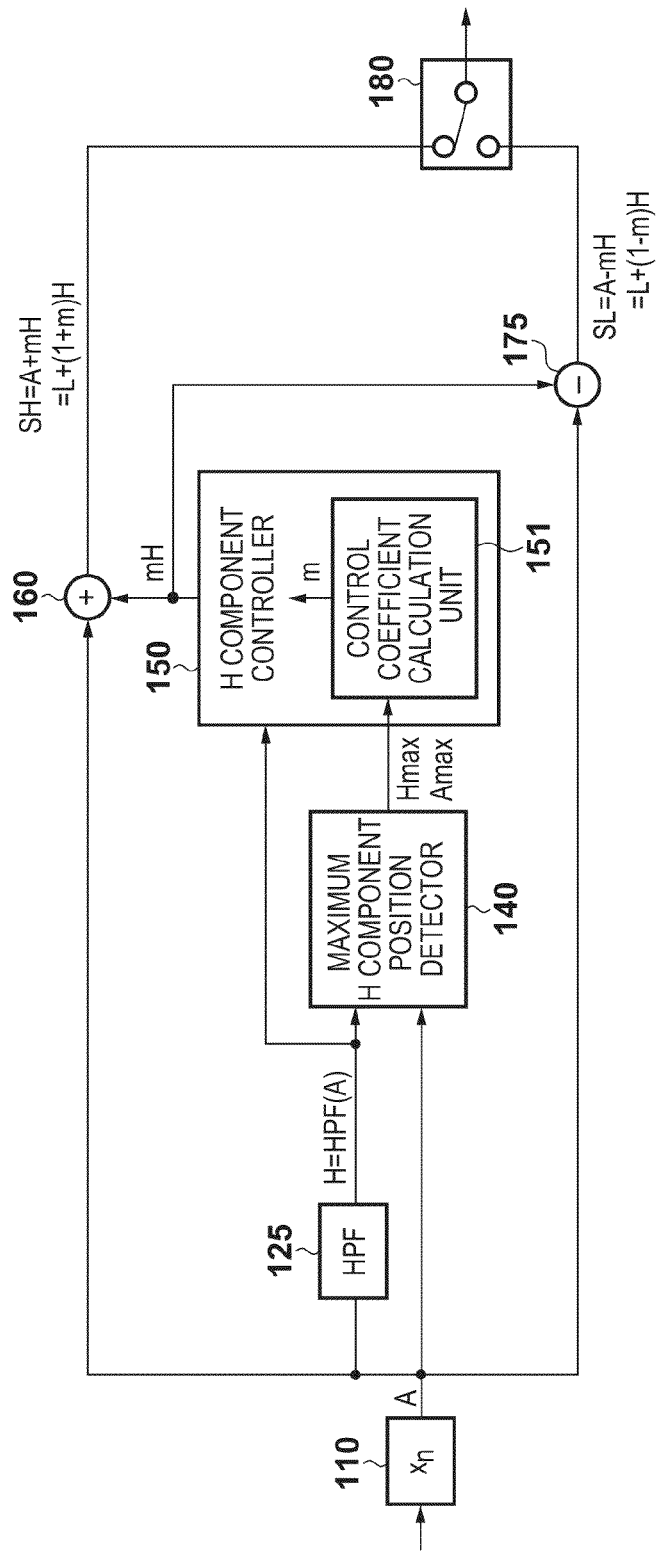
FIG. 6 is a schematic block diagram of an image display apparatus according to the second embodiment.

The first embodiment has explained an arrangement in which the LPF extracts the spatial frequency component of an image. The second embodiment will explain an arrangement in which a high pass filter (to be referred to as an HPF hereinafter) extracts the spatial frequency component of an image, FIG. 6 shows an example of the schematic blocks of an image display apparatus according to the second embodiment. In this arrangement, the image display apparatus includes an Nx speed processor 110, an HPF 125, a maximum high frequency component position detector 140, a high frequency component controller 150, an adder 160, a subtracter 175, and a selector 180. Note that the same reference numerals as those shown in FIG. 1 in the first embodiment denote the same blocks, and a description thereof will not be repeated.

The HPF 125 generates high frequency component image data H by separating and cutting off (filtering) a lower limit spatial frequency indicated by a predetermined constant from subframe data A output from the Nx speed processor 110. Note that the cutoff frequency mentioned here can be regarded as the number of pixels. The maximum high frequency component position detector 140 detects a pixel position where the polarity of the high frequency component is the same as that in a pixel of interest and the high frequency component amplitude becomes maximum in almost the same area as the filtering area of the HPF 125 centered on the pixel position of interest. Then, the maximum high frequency component position detector 140 outputs input image data Amax and high frequency component data Hmax at the detected pixel position.

The high frequency component controller 150 includes a control coefficient calculation unit 151 and calculates a control coefficient, m based on the input. Amax and Hmax. The high frequency component controller 150 performs distribution control by using the calculated control coefficient m for the high frequency component H at the pixel position of interest. In the second embodiment, mH is output. The adder 160 adds the distribution-controlled high, frequency component, data mH to the subframe data A, generating high frequency component emphasized image data SH whose high frequency component is emphasized, as represented by:

$$SH = A + mH = L + (1+m)H \quad (7)$$

The subtracter 175 subtracts the distribution-controlled high frequency component data mH from the subframe data A, generating low frequency component image data SL represented by:

$$SL = A - mH - L + (1-m)H \quad (8)$$

The selector 180 switches between the high frequency component emphasized image data SH and the low frequency component image data SL for each subframe to arrange them in a predetermined order and outputs them.

According to the second, embodiment, since the high frequency component controller is arranged, the gradation of a high frequency component emphasized image can be controlled to prevent generation of an overflow/underflow. Since the control coefficient of the high frequency component amplitude is the same in almost the same filtering area as the filtering area of the HPF, the gradation of the high frequency component emphasized image can be controlled while maintaining a monotonic increase/monotonic decrease of the high frequency component amplitude. Hence, there can be provided, an image display apparatus capable of suppressing a "motion blur" in accordance with the gradation of an input image without changing the gradation.

[Third Embodiment]

In the first and second embodiments, the control coefficient calculation unit 151 calculates the control coefficient m by applying the gradation Amax of input image data and the amplitude Hmax of high frequency component data to one of equations (1) to (4) described above. Equations (1) to (4) are based on the concept of preventing generation of an underflow/overflow in generation of a high frequency component emphasized image. That is, equations (1) to (4) are based on the concept of making the amplitude Hmax of high frequency component data fall within a difference between the gradation Amax of input image data, and 0 gradation when the polarity of the high frequency component is negative, or a maximum gradation when the polarity of the high frequency component is positive, When processes as in the first and second embodiments are applied to a display device such as a liquid-crystal display, a gradation visually recognized as the sum of the high frequency component emphasized image data SH and low frequency component image data SL may not be equal to the gradation of subframe data A. More specifically, in a liquid-crystal display apparatus, a response speed in rising transition and a response speed in falling transition are different. For example, in the liquid-crystal display apparatus, the falling response speed from an intermediate gradation to the vicinity of 0 gradation is high, but the rising response speed, from the vicinity of 0 gradation to an intermediate gradation is low. Depending on the gradation combination of SH and SL, SH+SL≠A and a change of the gradation is sometimes visually recognized.

In the third embodiment, in order to eliminate a combination of transition from the vicinity of 0 gradation, a control coefficient calculation unit 151 includes a control coefficient calculation adjustment means (not shown). The control coefficient calculation adjustment means adjusts the difference value between the gradation Amax of input image data and 0 gradation. More specifically, for a case in which the high frequency component amplitude has a negative polarity, the control coefficient calculation adjustment means calculates the control coefficient m according to equations (9) and (10) by multiplying the difference between the gradation Amax of input image data and. 0 gradation by a predetermined coefficient c (<1):

$$m = c \times A\max/|H\max| \; (c \times A\max < |H\max|) \quad (9)$$

$$m = 1 \; (cA\max \geq |H\max|) \quad (10)$$

Thus, when the high frequency component amplitude has a negative polarity, the minimum gradation of the high frequency component emphasized, image data SH can be controlled.

In equations (9) and (10), when the high frequency component amplitude has a negative polarity, the difference is multiplied by the predetermined coefficient c on the assumption that the response speed of the liquid crystal has an influence especially in transition from the vicinity of 0 gradation. However, the present invention is not limited to this. When the response speed of the liquid crystal has an influence even at the vicinity of the maximum gradation, the control coefficient m is calculated according to equations (11) and (12) for a case in which the high frequency component amplitude has a positive polarity:

$$m = c \times (2^n - A\max)/H\max$$

$$(c \times (2^n - A\max) < H\max) \quad (11)$$

$$m = 1 \; (c \times (2^n - A\max) \geq H\max) \quad (12)$$

where n is the number of gradation bits of an image. Therefore, when the high frequency component amplitude has a positive polarity, the maximum gradation of the high frequency component emphasized image data SH can be controlled.

According to the third embodiment, since the control coefficient calculation adjustment means is arranged in the control coefficient calculation unit, the minimum gradation/maximum gradation of high frequency component emphasized image data can be controlled. A transition combination of SH and SL from the vicinity of 0 gradation or the vicinity of the maximum gradation can be eliminated. As a result, there can be provided an image display apparatus capable of suppressing a "motion blur" without a change of the gradation arising from the response speed of a display device.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed, by the computer of the system or apparatus by, for example, reading out and executing the computer executable instructions from the storage medium to perform the functions of one or more of the above-described, embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read, only memory (ROM), a storage of distributed computing systems, an optical disk (such as a compact disc (CD), digital versatile disc (DVD), or BLU-RAY DISC™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-024916, filed Feb. 12, 2013 which is hereby incorporated by reference herein in its entirety.

What is claimed is:

1. An image display apparatus which divides a 1-frame period of input image data into a plurality of periods and displays image data in the respective divided periods, comprising:
   a generation unit configured to generate high frequency component data of the input image data;
   a detection unit configured to detect a pixel position having maximum amplitude of the high frequency component data in a predetermined area based on image area on which calculation for generating the high frequency component data of the input image data is executed; and
   a high frequency component control unit configured to distribute the high frequency component data for the image data in the respective divided periods based on a gradation at the detected pixel position of the input image data and the maximum amplitude of the high frequency component data to make the amplitude of the generated high frequency component data fall within a difference between the gradation at the detected pixel position of the input image data and one of 0 gradation or a maximum gradation according to a number of bits for 1 pixel data.

2. The apparatus according to claim 1, wherein said detection unit detects the pixel position having the maximum amplitude of the high frequency component data in the predetermined area where a polarity of the high frequency component data is the same as a polarity in the image area centered on a pixel of interest.

3. The apparatus according to claim 1, wherein said high frequency component control unit includes a control coefficient calculation unit configured to calculate a control coefficient based on the gradation at the detected pixel position of the input image and the maximum amplitude of the high frequency component data, and the high frequency component control unit controls the amplitude to be distributed, based on the control coefficient calculated by said control coefficient calculation unit.

4. The apparatus according to claim 3, wherein said control coefficient calculation unit calculates the control coefficient by using a coefficient (<1)for adjusting a difference value between the gradation of the input image and 0 gradation.

5. The apparatus according to claim 3, further comprising:
a first addition unit configured to add one of the amplitudes distributed by said high frequency component control unit to an amplitude of the input image data, thereby generating high frequency component emphasized image data; and
a second addition unit configured to add the other one of the amplitudes distributed by said high frequency component control unit to an amplitude of low frequency component data contained in the input image data, thereby generating low frequency component image data.

6. The apparatus according to claim 3, further comprising:
an addition unit configured to add the amplitude distributed by said high frequency component control unit to an amplitude of the input image data, thereby generating high frequency component emphasized image data; and
a subtraction unit configured to subtract the amplitude distributed by said high frequency component control unit from the amplitude of the input image data, thereby generating low frequency component image data.

7. The apparatus according to claim 5, wherein said generation unit generates the high frequency component data by generating the low frequency component data from the input image by using a low-pass filter, and subtracting the low frequency component data from the input image data.

8. The apparatus according to claim 6, wherein said generation unit generates the high frequency component data from the input image data by using a high pass filter.

9. The apparatus according to claim 5, further comprising a selector configured to output the high frequency component emphasized image data and the low frequency component image data alternately.

10. An image display method of dividing a 1-frame period of an input image into a plurality of periods and displaying image data generated from images in the respective divided periods, comprising:
generating high frequency component data of input image data;
detecting a pixel position having maximum amplitude of the high frequency component data in a predetermined area based on image area on which calculation for generating the high frequency component data of the input image data is executed; and
distributing the high frequency component data for the image data in the image data in the respective divided periods based on a gradation at the detected pixel position of the input image data and the maximum amplitude of the high frequency component data to make the amplitude of the separated high frequency component data fall within a difference between the gradation at the detected pixel position of the input image data and one of 0 gradation or a maximum gradation according to a number of bits for 1 pixel data.

11. A non-transitory computer-readable storage medium storing a computer program for controlling a computer to execute a method of dividing a 1-frame period of an input image into a plurality of periods and displaying image data generated from images in the divided periods, the method comprising:
generating high frequency component data of input image data;
detecting a pixel position having maximum amplitude of the high frequency component data in a predetermined area based on image area on which calculation for generating the high frequency component data of the input image data is executed; and
distributing the high frequency component data for the image data in the image data in the respective divided periods based on a gradation at the detected pixel position of the input image data and the maximum amplitude of the high frequency component data to make the amplitude of the separated high frequency component data fall within a difference between the gradation at the detected pixel position of the input image data and one of 0 gradation or a maximum gradation according to a number of bits for 1 pixel data.

12. The method according to claim 10, wherein, in said detecting step, the pixel position having the maximum amplitude of the high frequency component data in the predetermined area is detected where a polarity of the high frequency component data is the same as a polarity in the image area centered on a pixel of interest.

13. The method according to claim 10, further comprising calculating a control coefficient based on the gradation at the detected pixel position of the input image and the maximum amplitude of the high frequency component data, wherein the distributing step controls the amplitude to be distributed, based on the calculated control coefficient.

* * * * *